(12) United States Patent
Birkler et al.

(10) Patent No.: US 10,311,393 B2
(45) Date of Patent: *Jun. 4, 2019

(54) BUSINESS PROCESS MODEL ANALYZER AND RUNTIME SELECTOR

(71) Applicant: International Business Machines Corporation, Armonk, NY (US)

(72) Inventors: Khirallah Birkler, Bad Saulgau (DE); Boris Feist, Ehningen (DE); Martin A. Oberhofer, Bondorf (DE); Torsten Wilms, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/708,665

(22) Filed: Sep. 19, 2017

(65) Prior Publication Data

US 2018/0005150 A1  Jan. 4, 2018

Related U.S. Application Data

(63) Continuation of application No. 14/995,466, filed on Jan. 14, 2016, now Pat. No. 10,078,806, which is a continuation of application No. 13/624,992, filed on Sep. 24, 2012, now Pat. No. 9,275,355.

(51) Int. Cl.
*G06F 9/46* (2006.01)
*G06Q 10/06* (2012.01)

(52) U.S. Cl.
CPC ......... *G06Q 10/0633* (2013.01); *G06Q 10/06* (2013.01); *G06Q 10/067* (2013.01)

(58) Field of Classification Search
CPC .................................................... G06F 9/4843
USPC ............................................................ 718/100
See application file for complete search history.

(56) References Cited

U.S. PATENT DOCUMENTS

| | | | |
|---|---|---|---|
| 6,553,403 B1 | 4/2003 | Jarriel et al. | |
| 7,499,906 B2 * | 3/2009 | Kloppmann | G06Q 10/06 707/713 |
| 7,523,116 B2 * | 4/2009 | Yan | G06F 9/45516 |
| 7,818,714 B2 | 10/2010 | Ryan et al. | |
| 8,707,261 B2 * | 4/2014 | Heller | G06F 8/30 717/120 |

(Continued)

OTHER PUBLICATIONS

Bayer, et al.; "The Handbook to Dynamic Runtime Environments—Technical Description and Installation Guide"; Nordugrid; KnowArc D2.5-1; May 29, 2007; pp. 1-15; <http://dre.knowarc.eu:8080>.

(Continued)

*Primary Examiner* — Mehran Kamran
(74) *Attorney, Agent, or Firm* — Jose A. Medina-Cruz; Nicholas L. Cadmus; William H. Hartwell

(57) ABSTRACT

In a method for determining appropriate runtime environments for execution of a process model, a computer receives a process model. The process model includes a plurality of activities, wherein two activities are linked by a relationship. The computer determines that the two activities linked by a relationship match a process pattern. The computer determines one or more runtime environments for execution of the process model, wherein each of the one or more runtime environments is capable of executing the process pattern.

17 Claims, 6 Drawing Sheets

(56) References Cited

U.S. PATENT DOCUMENTS

| | | | | |
|---|---|---|---|---|
| 8,839,252 B1* | 9/2014 | Nolan | G06F 8/34 | 718/101 |
| 9,135,586 B2* | 9/2015 | Balko | G06F 9/4843 | |
| 9,275,355 B2 | 3/2016 | Birkler et al. | | |
| 2004/0172618 A1* | 9/2004 | Marvin | G06F 8/36 | 717/116 |
| 2005/0076344 A1* | 4/2005 | Goring | G06F 9/45508 | 719/320 |
| 2005/0097082 A1* | 5/2005 | Yan | G06F 9/45516 | |
| 2006/0036479 A1* | 2/2006 | Whitmore | G06Q 10/067 | 705/348 |
| 2006/0173893 A1* | 8/2006 | Kristoffersen | G06Q 10/10 | |
| 2006/0173894 A1* | 8/2006 | Kristoffersen | G06Q 10/10 | |
| 2007/0038492 A1* | 2/2007 | Ryan | G06F 8/10 | 705/7.26 |
| 2007/0055557 A1* | 3/2007 | Kloppmann | G06Q 10/06 | 707/781 |
| 2007/0234297 A1* | 10/2007 | Zorn | G06F 11/3612 | 717/124 |
| 2008/0120574 A1* | 5/2008 | Heredia | G06Q 10/06 | 715/835 |
| 2008/0134135 A1* | 6/2008 | Elaasar | G06F 8/75 | 717/104 |
| 2009/0044167 A1* | 2/2009 | Maeda | G03F 1/36 | 716/55 |
| 2009/0055203 A1* | 2/2009 | Dicken | G06Q 10/06 | 705/348 |
| 2009/0165001 A1* | 6/2009 | Baeuerle | G06F 9/4843 | 718/102 |
| 2009/0171732 A1* | 7/2009 | Bobak | G06Q 10/0633 | 705/7.13 |
| 2009/0192867 A1* | 7/2009 | Farooq | G06Q 10/06 | 705/7.29 |
| 2009/0198639 A1* | 8/2009 | Narayanaswamy | G06Q 10/04 | 706/48 |
| 2009/0216576 A1* | 8/2009 | Saeed | G06Q 10/06 | 705/7.11 |
| 2009/0281777 A1* | 11/2009 | Baeuerle | G06Q 10/06 | 703/6 |
| 2010/0064277 A1 | 3/2010 | Baird et al. | | |
| 2010/0081295 A1* | 4/2010 | Takahashi | G03F 1/36 | 438/800 |
| 2010/0142698 A1 | 6/2010 | Spottiswoode et al. | | |
| 2010/0174583 A1* | 7/2010 | Passova | G06Q 10/063 | 705/7.11 |
| 2010/0180260 A1* | 7/2010 | Chikkadevaiah | G06F 11/3664 | 717/125 |
| 2010/0199261 A1* | 8/2010 | Shenfield | G06F 8/20 | 717/107 |
| 2010/0199281 A1* | 8/2010 | Kettley | G06F 9/505 | 718/102 |
| 2010/0262451 A1 | 10/2010 | Bahrami et al. | | |
| 2010/0293537 A1* | 11/2010 | Broussard | G06F 9/44505 | 717/170 |
| 2011/0004499 A1 | 1/2011 | Zhang et al. | | |
| 2011/0023013 A1* | 1/2011 | Shenfield | G06F 8/35 | 717/107 |
| 2011/0153311 A1* | 6/2011 | Bogl | G06Q 10/06 | 704/9 |
| 2011/0264861 A1 | 10/2011 | Fee et al. | | |
| 2011/0314389 A1 | 12/2011 | Meredith et al. | | |
| 2012/0109708 A1* | 5/2012 | Mueller | G06Q 10/0633 | 705/7.27 |
| 2012/0110583 A1 | 5/2012 | Balko et al. | | |
| 2012/0137277 A1* | 5/2012 | Varadarajan | G06F 8/437 | 717/155 |
| 2012/0185821 A1* | 7/2012 | Yaseen | G06F 8/10 | 717/105 |
| 2012/0331351 A1* | 12/2012 | Davis | G06F 11/3664 | 714/38.1 |
| 2013/0041494 A1 | 2/2013 | Ausschnitt et al. | | |
| 2013/0110576 A1* | 5/2013 | Roy | G06Q 10/06 | 705/7.26 |
| 2013/0311628 A1* | 11/2013 | Kruglick | G06F 8/61 | 709/223 |
| 2016/0132797 A1 | 5/2016 | Birkler et al. | | |

OTHER PUBLICATIONS

MacCagnan, et al.; "A Multi-Agent System for the Automated Handling of Experimental Protocols in Biological Laboratories"; Proceedings of the 11th WOA 2010 Workshop; CEUR Workshop Proceedings; Sep. 5-7, 2010; vol. 621; Session 6; Paper 18; Copyright 2012 researchgate.net; 7 pages; <http://ceur-ws.org/Vol-621/paper18.pdf>.

Rickayzen, et al.; "Effective Business Processes using SAP's Webflow Engine"; Practical Workflow for SAP; Chapter 6—Workflow Administration; pp. 133-171; Galileo Press; <http://media.techtarget.com/searchSAP/downloads/chapter-november.pdf>.

* cited by examiner

EXAMPLE PATTERN 4 EYES PRINCIPLE (HUMAN - CENTRIC)

| ID | ACTIVITY KIND | POSITION | MUST MEET CONDITION | | OCCURRENCE OPTIONAL |
|---|---|---|---|---|---|
| HT1 | HUMAN | X | | | NO |
| HT2 | HUMAN | X + OFFSET(1-3) | ASSIGNEE(HT2) ASSIGNEE(HT1) | != | NO |

EXAMPLE PATTERN PARALLEL APPROVAL (HUMAN - CENTRIC)

| ID | ACTIVITY KIND | POSITION | MUST MEET CONDITION | | OCCURRENCE OPTIONAL |
|---|---|---|---|---|---|
| HT1 | HUMAN | X | | | NO |
| HT2 | HUMAN | PARALLEL PATH(X) | INPUTMSG(HT2) INPUTMSG(HT1) & ASSIGNEE(HT2) ASSIGNEE(HT1) | ? != | NO |
| HTn | HUMAN | PARALLEL PATH(X) | INPUTMSG(HTn) INPUTMSG(HT1, HT2) & ASSIGNEE(HTn) ASSIGNEE(HT1, HT2) | ? != | YES |

FIG. 4

BUSINESS PROCESS MODEL ANALYZER AND RUNTIME SELECTOR

TECHNICAL FIELD

The present invention relates generally to the field of business process models, and more specifically to a method, system, and computer program product for analyzing a business process model to determine appropriate runtime environments for execution of the process model.

BACKGROUND

Enterprise process modeling and development environments allow developers to use tools to model, develop and deploy business process applications in standardized formats (e.g., Business Process Model and Notation (BPMN) and Business Process Execution Language (BPEL)) leveraging standardized protocols (Simple Object Access Protocol (SOAP), Java Message Service (JMS), Hypertext Transfer Protocol (HTTP), etc.) to integrate with third party systems.

Previously described modeling and development environments can be classified into high-level (typically runtime-independent) process modeling tools, such as IBM® WebSphere® Business Modeler Advanced, and runtime-specific model implementation tools, such as IBM® WebSphere® Integration Developer. Process modeling tools usually cover one or several modeling standards, such as BPMN and BPEL, which are independent from a particular product/technology.

Artifacts created in the modeling tools serve as input for runtime specification tools, which bridge the process model and one (or several) specific runtime environments. If there are runtime environments capable of interpreting industry standard models the process modeling tools may export models directly to the runtime environments.

A business process runtime environment, such as IBM® WebSphere® Process Server, executes processes designed by such modeling and development environments. Different business process runtime environments have different strengths and weaknesses.

A typical process model contains a collection of related, structured activities or tasks that produce a specific service or product. Typically, a process model represents the entirety or part of an enterprise's business process. A process model may be broken down into several sub-processes.

SUMMARY

Aspects of an embodiment of the present invention disclose a method and a program product for determining appropriate runtime environments for execution of a process model. A computer receives a process model. The process model includes a plurality of activities, wherein a first activity of the plurality of activities and a second activity of the plurality of activities are linked by a first relationship. The computer determines that the first activity of the plurality of activities and the second activity of the plurality of activities linked by the first relationship match a process pattern, wherein the process pattern comprises a predefined third activity and a predefined fourth activity linked by a predefined second relationship. The computer determines one or more runtime environments for execution of the process model, wherein each of the one or more runtime environments is capable of executing the process pattern.

BRIEF DESCRIPTION OF THE SEVERAL VIEWS OF THE DRAWINGS

FIG. 4 is an exemplary pattern catalogue, in accordance with one embodiment of the present invention.

DETAILED DESCRIPTION

Figure 1:
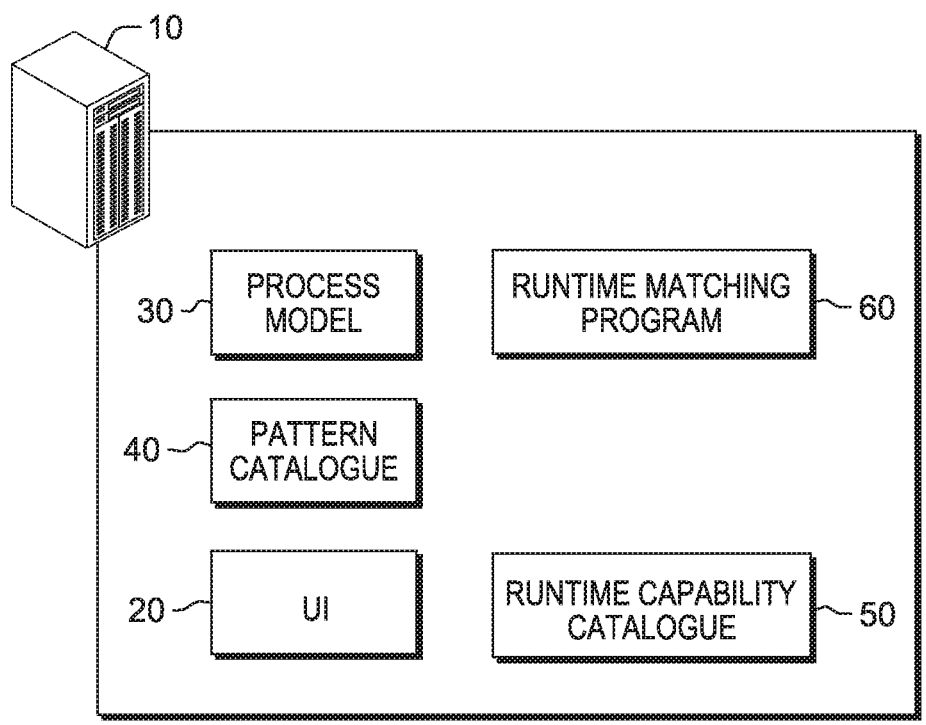
FIG. 1 depicts a diagram of a computing system, in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

FIG. 1 depicts a diagram of computing system 10 in accordance with one embodiment of the present invention. FIG. 1 provides only an illustration of one embodiment and does not imply any limitations with regard to the environments in which different embodiments may be implemented.

Computing system 10 is a desktop computer. In other embodiments computing system 10 may be a laptop computer, tablet computer, personal digital assistant (PDA), smart phone, management server, web server, or a server computing system utilizing multiple computers as a server system, such as in a cloud computing environment. In general, computing system 10 may be any electronic device or computing system capable of executing computer program code. Computing system 10 contains UI (User Interface) 20, process model 30, pattern catalogue 40, runtime capability catalogue 50, and runtime matching program 60. Computing system 10 may include internal and external components as described in further detail with respect to FIG. 6.

UI 20 operates on computing system 10 to visualize content, such as reports, menus and icons, and to allow a user to interact with the computing system or an application. In one embodiment, UI 20 comprises an interface to runtime matching program 60. UI 20 may display data received from runtime matching program 60 and send user input to the runtime matching program. In other embodiments, UI 20 may comprise one or more interfaces, such as, an operating system interface and application interfaces.

Process model 30 is a business process model file in a standardized format. Standardized formats may include BPMN, BPEL, or any other standardized format. Process model 30 includes a collection of related activities. In one embodiment, process model 30 includes at least two activities that have a relationship between them. An example process model is discussed in greater detail with reference to FIG. 3. In one embodiment, process model 30 is located on computing system 10. In another embodiment, process model 30 may be located on another computing system, provided that process model 30 is accessible to runtime matching program 60.

Pattern catalogue 40 is a repository containing one or more predefined process patterns. A process pattern contains at least two activities that have a relationship between them. Pattern catalogue 40 serves as input for runtime matching program 60.

In one embodiment, each process pattern in pattern catalogue 40 is described in a database table with each row representing an activity present in the pattern. Columns of the database table represent attributes of each activity. Attributes of each activity may be but are not limited to the following: the activity kind (e.g., human, service call, database operation, rules resolution, etc), a relative position of an activity to other activities in the table (e.g., in a parallel path to other activities or in the same path within a defined offset to other activities), conditions that must be matched by an activity (e.g., potential/real users/assignees), and an indication whether the activity is optional.

In one embodiment, a process pattern may contain one or more workload properties. Workload properties describe workload characteristics important for the execution of a respective process pattern. Depending on the individual process pattern, different workload properties influence the process pattern execution and the choice of the correct runtime environment for execution of the process pattern. For example, the number of concurrent users served by the process pattern is an important workload property of some human-centric patterns. Also, the maximum expected number of transactions in a certain time period is a workload property for some integration-centric and data-centric patterns. A value is entered for the one or more workload properties for a process pattern containing one or more workload properties. In one embodiment, an application developer is prompted by runtime matching program 60 to enter a value for the one or more workload properties. In another embodiment, the value may be predefined with the workload property contained in the process pattern. The application developer may be prompted with an opportunity to change the predetermined value if desired.

In one embodiment, a relationship between activities may be defined by one or a combination of attributes of activities in the process pattern. An example of pattern catalogue 40 including exemplary process patterns is discussed in greater detail with reference to FIG. 4.

Process patterns in pattern catalogue 40 are categorized into different process domains such as: human-centric, document-centric, information-centric, and integration-centric. A process pattern may also belong to several domains, for instance a process pattern depicting a process in which several human participants provide input into an electronic form might belong to both the human-centric, as well as, the document-centric domains. Patterns are categorized in order to identify the predominant nature of each process pattern.

In one embodiment, pattern catalogue 40 is located on computing system 10. In another embodiment, pattern catalogue 40 may be located on another computing system or another computing device, provided that the pattern catalogue is accessible to runtime matching program 60. In one embodiment, pattern catalogue 40 is a database such as an Oracle® database or an IBM® DB2® database. In other embodiments, pattern catalogue 40 may be a repository that may be read by runtime matching program 60.

Runtime capability catalogue 50 is a repository containing a list of one or more runtime environments. Each runtime environment is listed with one or more process patterns it is capable of executing. In another embodiment, a runtime environment may also be associated with a relative performance value for each process pattern it supports. The performance value weighs the performance of the respective runtime environment in regard to a process pattern in comparison to other runtime environments which also support the same process pattern. The performance values may be determined by prior testing (e.g., benchmarking) of process pattern on each runtime environment capable of executing the process pattern.

In one embodiment, if a process pattern contains one or more workflow properties each runtime environment in runtime capability catalogue 50 capable of executing the process pattern is associated with data describing to what extent the runtime environment supports each of the one or more workflow properties. Data may refer to a value, a value range, pairs or enumeration of values, or any other interpretable data that a workload property value provided by an application developer can be evaluated against. For example, the number of concurrent users served by a particular process pattern may be set at a maximum of 100 for a particular runtime environment.

In one embodiment, runtime capability catalogue 50 is located on computing system 10. In another embodiment, runtime capability catalogue 50 may be located on another computing system or another computing device, provided the runtime capability catalogue is accessible to runtime matching program 60. In one embodiment, runtime capability catalogue 50 is a repository that may be read by runtime matching program 60. In other embodiments, runtime capability catalogue 50 may be a database such as an Oracle® database or an IBM® DB2® database.

Runtime matching program 60 operates to analyze process model 30 to determine appropriate runtime environments for execution of the process model. In one embodiment, runtime matching program 60 resides on computing system 10. In other embodiments, runtime matching program 60 may reside on another computing system provided the runtime matching program has access to process model 30, pattern catalogue 40, and runtime capability catalogue 50, and provided the runtime matching program is accessible to UI 20.

In one embodiment, runtime matching program 60 receives process model 30, which includes a collection of related activities. Runtime matching program 60 determines that at least two activities that have a relationship, match a process pattern. The process pattern includes predefined related activities. Runtime matching program 60 determines runtime environments for execution of process model 30. Each runtime environment determined is capable of executing the process pattern.

Figure 2:
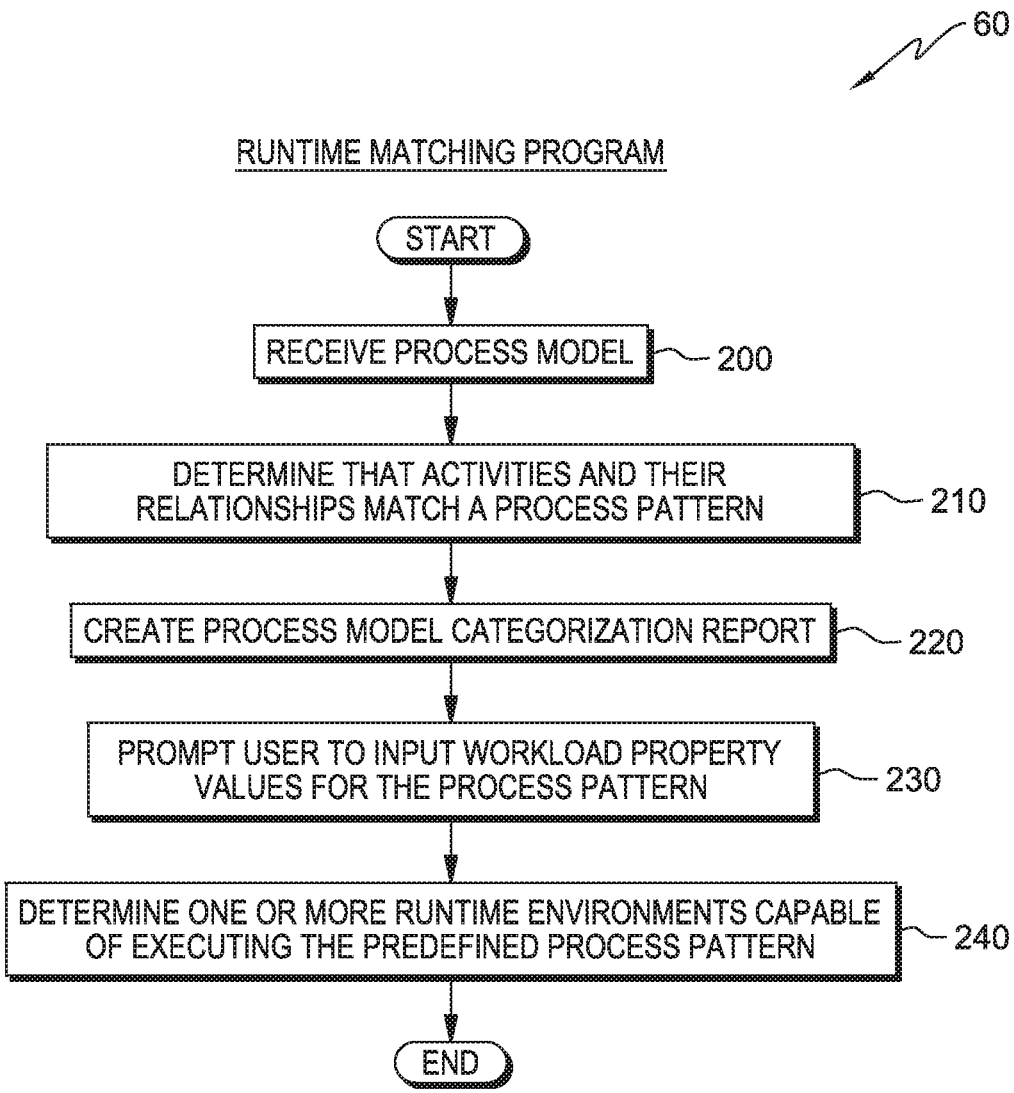
FIG. 2 depicts a flowchart of the steps of a runtime matching program executing within the computing system of FIG. 1, for analyzing a business process model to determine appropriate runtime environments for execution of the process model, in accordance with one embodiment of the present invention.

FIG. 2 depicts a flowchart of the steps of runtime matching program 60 executing within computing system 10 of FIG. 1, for analyzing process model 30 to determine appropriate runtime environments for execution of the process model, in accordance with one embodiment of the present invention.

In one embodiment, initially, a process model developer creates process model 30 using a process modeling tool, such as IBM® WebSphere® Business Modeler Advanced. Process model 30 is a business process model file in a standardized format. Standardized formats may include BPMN or BPEL. The process modeling tool sends process model 30 to runtime matching program 60.

In step 200, runtime matching program 60 receives process model 30 from the process modeling tool. In one embodiment, process model 30 includes a plurality of related activities of which at least two activities have a relationship. In one embodiment, the process modeling tool is located on computing system 10. In other embodiments, the process modeling tool is located on another computing system provided the process modeling tool can communicate with runtime matching program 60.

In step 210, runtime matching program 60 determines the at least two activities that have a relationship in process model 30 match a process pattern in pattern catalogue 40, wherein the process pattern includes at least two predefined activities linked by a predefined relationship.

In one embodiment, runtime matching program 60 traverses process model 30 once for each process pattern in pattern catalogue 40. Generally, a process model includes a number of activities and these activities can be in a sequential and/or parallel arrangement. The activities and the activities links can be described as a graph of nodes and edges. Runtime matching program 60 uses a graph traversal algorithm to visit all the nodes in the graph (e.g., going from activity to activity in process model 30). The traversal may be implemented using a text or Extensible Markup Language (XML) interpreter because most process models are represented as XML data structures. In order to determine if a process pattern from pattern catalogue 40 exists in process model 30, runtime matching program 60 evaluates if all related activities in a process pattern are present in process model 30 in the required arrangement and have the required relationships.

In one embodiment, during the traversal runtime matching program 60 checks each activity for a potential starting point of a process pattern and from thereon evaluates the other activities in process model 30 for a process pattern. Runtime matching program 60 may check for activities following a given activity within a certain offset/range. A process pattern containing an offset/range between two related activities in the pattern allows for non-related activities to be present between the two related activities. By using an offset/range, it is possible for runtime matching program 60 to be tolerant of non-related activities between related activities in the process pattern. Runtime matching program 60 may also be able to detect parallel paths and activities therein.

For example, from each activity in process model 30, runtime matching program 60 proceeds for "n" activities evaluating if activities 1 through "n" match a process pattern. Where parallel activities exist runtime matching program 60 may proceed from an activity (activity 1) down two paths to the "$n^{th}$" activity through a first path and the "$m^{th}$" activity through a second path. When runtime matching program 60, during the traversal of process model 30, reaches a point where parallel paths spawn, it may use a look-ahead strategy by proceeding down all paths to look for parallel activity patterns.

In step 220, runtime matching program 60 creates a process model categorization report. In one embodiment, runtime matching program 60 creates a file detailing one or more process patterns from pattern catalogue 40 found in process model 30. The report may include the name of each of the one or more process patterns found in process model 30 and the process domain or domains to which each of the one or more process patterns belongs. Runtime matching program 60 queries pattern catalogue 40 to retrieve the name of each of the one or more process patterns found in process model 30 and the process domain or domains to which each of the one or more process patterns belongs. The report may also indicate each of the one or more process patterns' position relative to the other process patterns found in process model 30. In another embodiment, runtime matching program 60 may skip this step.

In step 230, runtime matching program 60 prompts a user at UI 20 to input a value for workload properties associated with each of the one or more process patterns found in process model 30. In one embodiment, runtime matching program 60 queries pattern catalogue 40 to determine workload properties associated with each of the one or more process patterns found in process model 30. Runtime matching program 60 sends a prompt to UI 20. The prompt may be in the form of a pop up window presenting the workload properties associated with each of the one or more process patterns found in process model 30 along with a data entry field for each property. Runtime matching program 60 receives a value for workload properties associated with each of the one or more process pattern found in process model 30 from UI 20. In another embodiment, runtime matching program 60 may skip step 230 if none of the one or more process patterns found in process model 30 have an associated workload property.

In step 240, runtime matching program 60 determines one or more runtime environments for execution of process model 30. In one embodiment, runtime matching program 60 queries runtime capability catalogue 50 to determine one or more runtime environments capable of executing any of the one or more process patterns found in process model 30. Runtime matching program 60 creates a report detailing the runtime environments capable of executing any of the one or more process patterns found in process model 30.

In another embodiment, if one process pattern of the one or more process patterns found in process model 30 has an associated workload property and step 230 is complete, runtime matching program 60 queries runtime capability catalogue 50 to determine if any of the one or more runtime environments capable of executing the one process pattern of the one or more process patterns is capable of meeting the required value of the associated workload property.

In another embodiment, for each of the one or more process patterns found in process model 30, runtime matching program 60 may rank the runtime environments capable of executing the process pattern. Runtime matching program 60 queries runtime capability catalogue 50 to retrieve the performance value associated with the runtime environments capable of executing that process pattern. Runtime matching program 60 ranks the runtime environments capable of executing that process pattern according to the retrieved performance value.

In another embodiment, runtime matching program 60 queries runtime capability catalogue 50 to determine one or more runtime environments capable of executing all process patterns found in process model 30. Runtime matching program 60 creates a report detailing the runtime environments capable of executing all process pattern found in process model 30.

Figure 3:
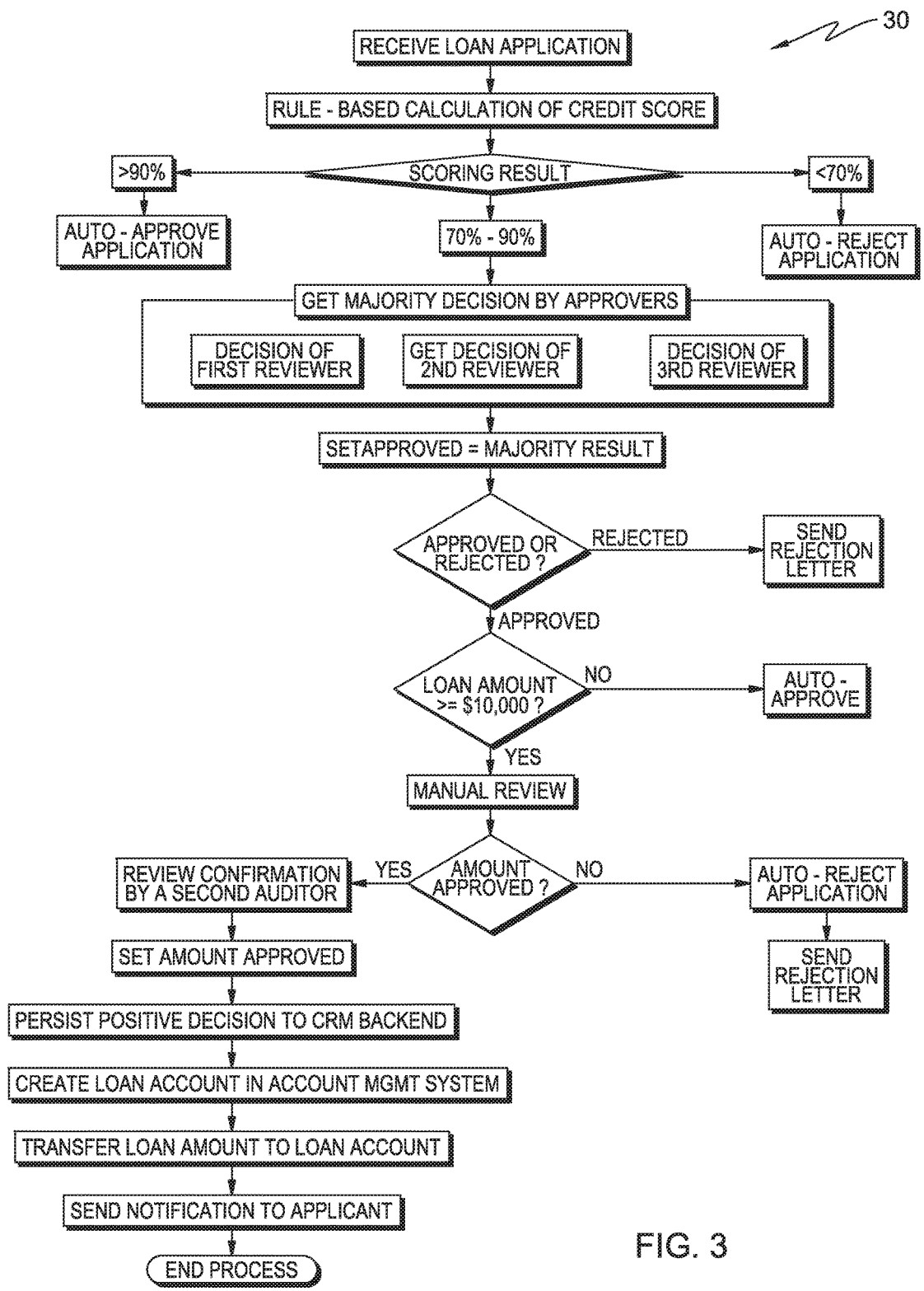
FIG. 3 is an exemplary flowchart representing a process model, in accordance with one embodiment of the present invention.

FIG. 3 is an exemplary flowchart representing process model 30 in accordance with one embodiment of the present invention. Process model 30 includes a collection of related activities representing a process for approving or disapproving a loan application. Process model 30 represents an input to runtime matching program 60. This flowchart is a clean version of the flowchart in FIG. 5 without any patterns identified.

FIG. 4 is an exemplary pattern catalogue 40 in accordance with one embodiment of the present invention. Pattern catalogue 40 contains process patterns 400 and 410.

Process pattern 400 is called the "4 eyes principle" and belongs to the human-centric process domain. Process pattern 400 includes activities 402 and 404. Activities 402 and 404 have a relationship defined by the attribute columns (e.g., activity kind, position, conditions, and optional occurrence). In this example, activities 402 and 404 must be human activities, not performed by the same person, and the activities must be within a 1 to 3 position offset from each other.

Process pattern 410 is called the "parallel approval" pattern and belongs to the human-centric process domain. Process pattern 410 includes activities 412, 414, and 416. Activities 412, 414, and 416 have a relationship defined by the attribute columns (e.g., activity kind, position, conditions, and optional occurrence). In this example, activities 412 and 414 must be human activities, not performed by the same person, and the activities must on a parallel path with each other. Activity 416 represents an optional "$n^{th}$" activity that must be a human activity, not performed by the persons performing 412, 414, or any other parallel path activity, and the activity must be on a parallel path with activity 412, 414, or any other parallel path activity.

Figure 5:
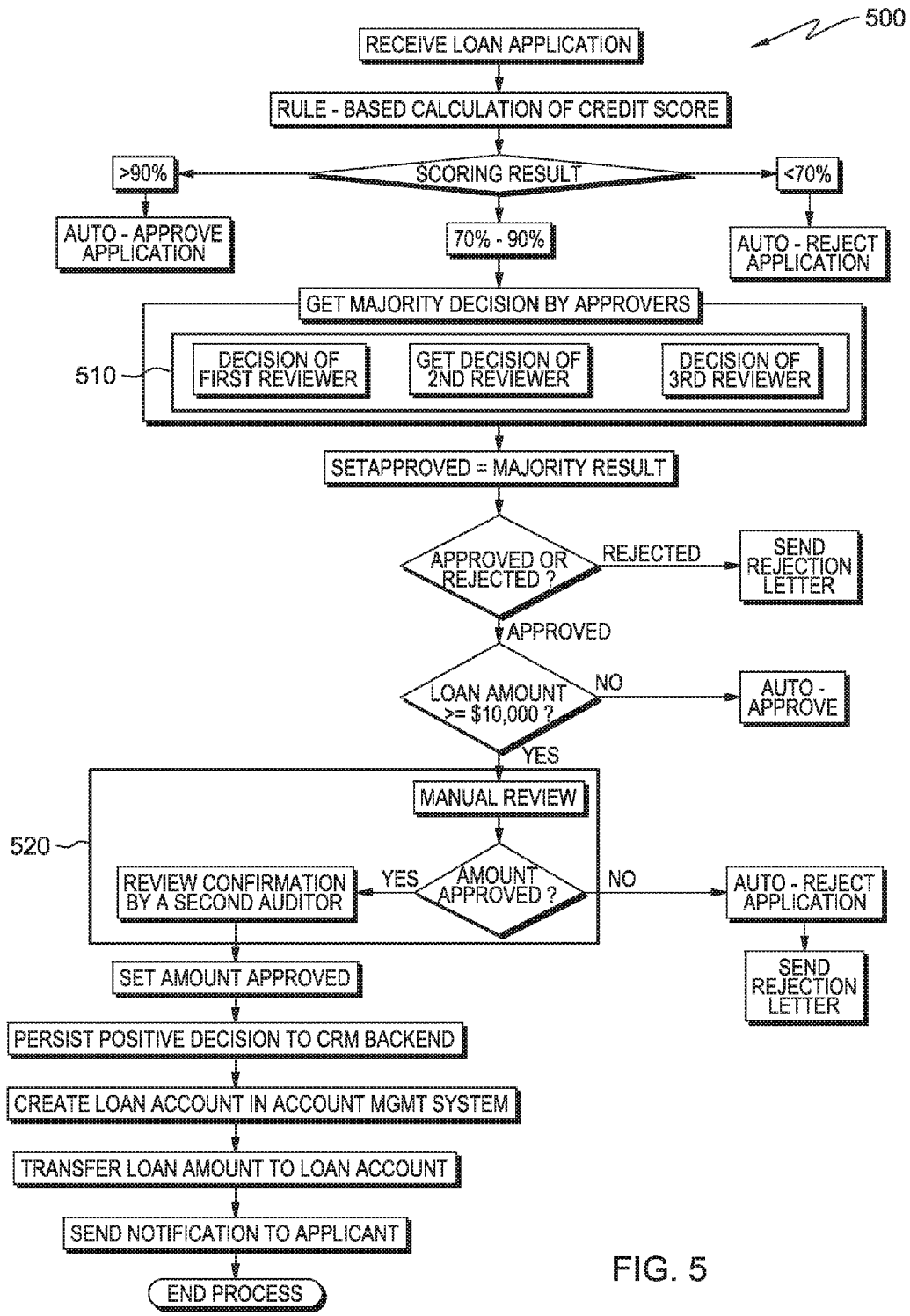
FIG. 5 depicts an exemplary flowchart highlighting process patterns from a pattern catalogue found in a process model, in accordance with one embodiment of the present invention.

FIG. 5 depicts exemplary flowchart 500 highlighting process patterns 400 and 410 from pattern catalogue 40 found in process model 30, in accordance with one embodiment of the present invention.

In one embodiment, runtime matching program 60, in step 210, traverses process model 30 (FIG. 3) once for each process pattern in pattern catalogue 40 (FIG. 4). FIG. 5 shows where process patterns 400 and 410 are found in process model 30.

Box 510 highlights where pattern 410 is found in process model 30. The three activities in box 510 (e.g., decisions of three reviewers) are human activities. The three activities are on a parallel path with each other and are each performed by a unique person (e.g., first reviewer, second reviewer, and third reviewer). The three activities match the activities and the relationship among these activities required in process pattern 410.

Box 520 shows where pattern 400 is found in process model 30. There are two human activities within a 1 to 3 position offset that are not performed by the same person in box 520 (e.g., manual review and review confirmation by a second auditor). The two human activities match the activities and the relationship required in process pattern 400.

Figure 6:
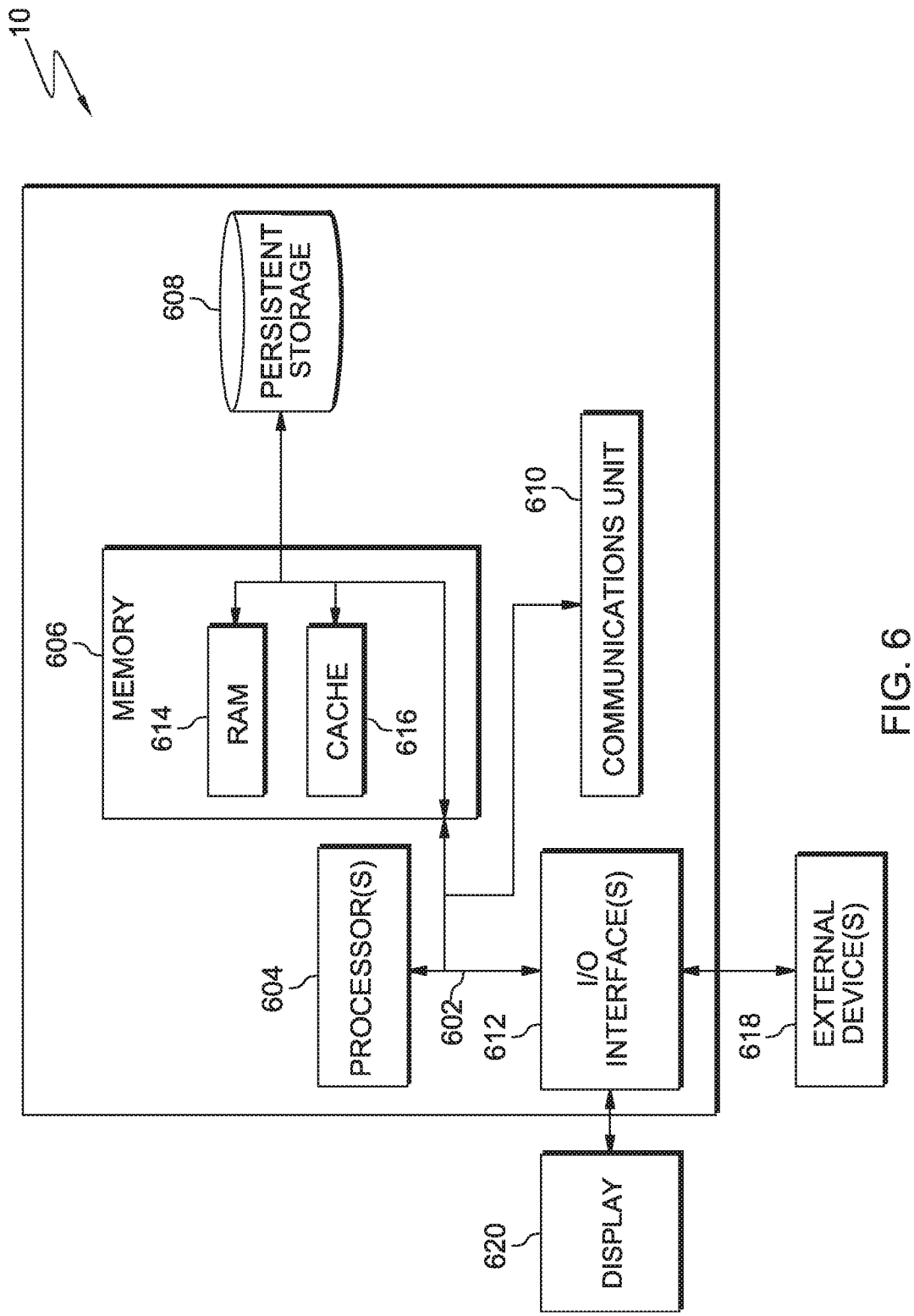
FIG. 6 depicts a block diagram of components of the computing system of FIG. 1, in accordance with one embodiment of the present invention.

FIG. 6 depicts a block diagram of components of computing system 10 in accordance with one embodiment of the present invention. It should be appreciated that FIG. 6 provides only an illustration of one implementation and does not imply any limitations with regard to the environments in which different embodiments may be implemented. Many modifications to the depicted environment may be made.

Computing system 10 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In one embodiment, memory 606 includes random access memory (RAM) 614 and cache memory 616. In general, memory 606 can include any suitable volatile or non-volatile computer-readable storage media.

UI 20, process model 30, pattern catalogue 40, runtime capability catalogue 50, and runtime matching program 60 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. UI 20, process model 30, pattern catalogue 40, runtime capability catalogue 50, and runtime matching program 60 may be downloaded to persistent storage 608 through communications unit 610.

I/O interface(s) 612 allows for input and output of data with other devices that may be connected to computing system 10. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., UI 20, process model 30, pattern catalogue 40, runtime capability catalogue 50, and runtime matching program 60, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining appropriate runtime environments for execution of a process model, the method comprising the steps of:

receiving, by one or more processors, a process model, wherein the process model comprises a plurality of activities, wherein a first activity of the plurality of activities and a second activity of the plurality of activities are linked by a first relationship;

traversing, by one or more processors, the process model once for each process pattern of a plurality of process patterns in a process pattern catalogue to determine whether all activities in a particular process pattern are present in the process model in the same arrangement and with the same relationships, wherein the traversing is done using a graph traversal algorithm, and wherein the traversing further comprises determining, by one or more processors, for each process pattern of the plurality of process patterns, whether a first related activity in the respective process pattern is within a certain offset of a second related activity;

determining, by one or more processors, based on the traversing, that the process model matches a process pattern, wherein the process pattern has a workload property, including a value;

determining, by one or more processors, one or more runtime environments for execution of the process model, wherein each of the determined one or more environments is capable of executing the process pattern and is capable of meeting the value for the workload property; and executing, by one or more processors, the process model in the one or more runtime environments.

2. The method of claim 1, wherein determining, by one or more processors, one or more runtime environments for execution of the process model, wherein each of the determined one or more environments is capable of executing the process pattern and is capable of meeting the value for the workload property comprises:
  determining, by one or more processors, a plurality of runtime environments for execution of the process model, wherein each of the determined plurality of runtime environments is capable of executing the process pattern and is capable of meeting the value for the workload property;
  determining, by one or more processors, performance values for the process pattern executed on each of the determined plurality of runtime environments;
  ranking, by one or more processors, the plurality of runtime environments based on the determined performance values; and
  determining, by one or more processors, one or more runtime environments for execution of the process model based on the ranking of the plurality of runtime environments.

3. The method of claim 1, wherein the plurality of runtime environments comprises at least one runtime environment, wherein each runtime environment of the at least one runtime environment is listed with one or more process patterns that it is capable of executing.

4. The method of claim 1, further comprising creating, by one or more processors, a report, wherein the report comprises information on the process pattern found in the process model.

5. The method of claim 1, wherein the workload property is a characteristic required of a runtime environment in order for that runtime environment to execute the process pattern.

6. The method of claim 1, wherein traversing, by one or more processors, the process model once for each process pattern of a plurality of process patterns in a process pattern catalogue to determine whether all activities in a particular process pattern are present in the process model in the same arrangement and with the same relationships, wherein the traversing is done using a graph traversal algorithm further comprises:
  determining, by one or more processors, parallel paths and activities for each process pattern of the plurality of process patterns.

7. A computer system for determining appropriate runtime environments for execution of a process model comprising:
  one or more computer processors;
  one or more computer readable media; and
  program instructions, stored on the one or more computer readable media for execution by at least one of the one or more processors, the program instructions comprising:
  program instructions to receive a process model, wherein the process model comprises a plurality of activities, wherein a first activity of the plurality of activities and a second activity of the plurality of activities are linked by a first relationship;
  program instructions to traverse the process model once for each process pattern of a plurality of process patterns in a process pattern catalogue to determine whether all activities in a particular process pattern are present in the process model in the same arrangement and with the same relationships, wherein the traversing is done using a graph traversal algorithm, and wherein the traversing further comprises determining, by one or more processors, for each process pattern of the plurality of process patterns, whether a first related activity in the respective process pattern is within a certain offset of a second related activity;
  program instructions to determine based on the traversing, that the process model matches a process pattern, wherein the process pattern has a workload property, including a value;
  program instructions to determine one or more runtime environments for execution of the process model, wherein each of the determined one or more environments is capable of executing the process pattern and is capable of meeting the value for the workload property; and
  program instructions to execute the process model in the one or more runtime environments.

8. The computer system of claim 7, wherein the program instructions to determine one or more runtime environments for execution of the process model, wherein each of the determined one or more environments is capable of executing the process pattern and is capable of meeting the value for the workload property comprises:
  program instructions to determine a plurality of runtime environments for execution of the process model, wherein each of the determined plurality of runtime environments is capable of executing the process pattern and is capable of meeting the value for the workload property;
  program instructions to determine performance values for the process pattern executed on each of the determined plurality of runtime environments;
  program instructions to rank the plurality of runtime environments based on the determined performance values; and
  program instructions to determine one or more runtime environments for execution of the process model based on the ranking of the plurality of runtime environments.

9. The computer system of claim 7, wherein the plurality of runtime environments comprises at least one runtime environment, wherein each runtime environment of the at least one runtime environment is listed with one or more process patterns that it is capable of executing.

10. The computer system of claim 7, further comprising program instructions to create a report, wherein the report comprises information on the process pattern found in the process model.

11. The computer system of claim 7, wherein the workload property is a characteristic required of a runtime environment in order for that runtime environment to execute the process pattern.

12. The computer system of claim 7, wherein the program instructions to traverse the process model once for each process pattern of a plurality of process patterns in a process pattern catalogue to determine whether all activities in a particular process pattern are present in the process model in the same arrangement and with the same relationships, wherein the traversing is done using a graph traversal algorithm further comprise:
  program instructions to determine parallel paths and activities for each process pattern of the plurality of process patterns.

13. A computer program product for determining appropriate runtime environments for execution of a process model comprising:

one or more computer readable storage media; and program instructions stored on the one or more computer readable storage media, the program instructions comprising:

program instructions to receive a process model, wherein the process model comprises a plurality of activities, wherein a first activity of the plurality of activities and a second activity of the plurality of activities are linked by a first relationship;

program instructions to traverse the process model once for each process pattern of a plurality of process patterns in a process pattern catalogue to determine whether all activities in a particular process pattern are present in the process model in the same arrangement and with the same relationships, wherein the traversing is done using a graph traversal algorithm, and wherein the traversing further comprises determining, by one or more processors, for each process pattern of the plurality of process patterns, whether a first related activity in the respective process pattern is within a certain offset of a second related activity;

program instructions to determine based on the traversing, that the process model matches a process pattern, wherein the process pattern has a workload property, including a value;

program instructions to determine one or more runtime environments for execution of the process model, wherein each of the determined one or more environments is capable of executing the process pattern and is capable of meeting the value for the workload property; and program instructions to execute the process model in the one or more runtime environments.

14. The computer program product of claim 13, wherein the program instructions to determine one or more runtime environments for execution of the process model, wherein each of the determined one or more environments is capable of executing the process pattern and is capable of meeting the value for the workload property comprises:

program instructions to determine a plurality of runtime environments for execution of the process model, wherein each of the determined plurality of runtime environments is capable of executing the process pattern and is capable of meeting the value for the workload property;

program instructions to determine performance values for the process pattern executed on each of the determined plurality of runtime environments;

program instructions to rank the plurality of runtime environments based on the determined performance values; and program instructions to determine one or more runtime environments for execution of the process model based on the ranking of the plurality of runtime environments.

15. The computer program product of claim 13, wherein the plurality of runtime environments comprises at least one runtime environment, wherein each runtime environment of the at least one runtime environment is listed with one or more process patterns that it is capable of executing.

16. The computer program product of claim 13, further comprising further comprising program instructions to create a report, wherein the report comprises information on the process pattern found in the process model.

17. The computer program product of claim 13, wherein the program instructions to traverse the process model once for each process pattern of a plurality of process patterns in a process pattern catalogue to determine whether all activities in a particular process pattern are present in the process model in the same arrangement and with the same relationships, wherein the traversing is done using a graph traversal algorithm further comprise:

program instructions to determine parallel paths and activities for each process pattern of the plurality of process patterns.

* * * * *